United States Patent [19]

Jung

[11] 3,957,084
[45] May 18, 1976

[54] DEVICE FOR CARRYING FLEXIBLE CABLES OR PIPES FROM A FIXED CONNECTION POINT TO A MOBILE CONSUMER BY MEANS OF A FLEXIBLE TUBE

[75] Inventor: Werner Jung, Rheydt, Germany

[73] Assignee: Katrapat AG, Zug, Switzerland

[22] Filed: Feb. 11, 1974

[21] Appl. No.: 441,104

[30] Foreign Application Priority Data
Feb. 14, 1973 Germany................ 7305486[U]

[52] U.S. Cl................. 138/122; 138/136
[51] Int. Cl.²........................ F16L 11/00
[58] Field of Search......... 138/118.1, 121–136

[56] References Cited
UNITED STATES PATENTS

| | | | |
|---|---|---|---|
| 2,028,793 | 1/1936 | Mascuch | 138/136 X |
| 2,145,182 | 1/1939 | Kirch | 138/136 X |
| 2,817,363 | 12/1957 | Penrose | 138/122 |
| 3,311,133 | 3/1967 | Kinander | 138/136 |
| 3,340,900 | 9/1967 | Spurlock | 138/136 |
| 3,578,777 | 5/1971 | De Gain | 138/121 |

Primary Examiner—Leonard D. Christian
Attorney, Agent, or Firm—Herbert E. Kidder

[57] ABSTRACT

There is provided a device for carrying flexible cables or pipes from a fixed connection point to a mobile consumer. The device consists of a flexible support tube which may be either formed from a profiled strip would on itself with intermeshing edges, or a corrugated tube. In order to limit the flexibility of the tube to one direction, there are provided a series of spacers keeping a longitudinally continuous zone of the tube at a substantially constant length. The tube can thus only bend by compression or extension of the zone immediately opposite the zone of constant length. The spacers may take various forms such as a continuous strip secured to one surface of the tube, or a series of individual spacers entering formations in the tube. The individual spacers may in fact be individually secured to the tube or they may be carried on a strip.

16 Claims, 17 Drawing Figures

DEVICE FOR CARRYING FLEXIBLE CABLES OR PIPES FROM A FIXED CONNECTION POINT TO A MOBILE CONSUMER BY MEANS OF A FLEXIBLE TUBE

The invention relates to devices for carrying flexible cables or pipes from a fixed connection point to a mobile consumer, by means of a flexible support tube, particularly, but not solely, formed by winding a strip, shaped with two or more grooves, onto itself in such a manner that the edges of the individual windings engage in each other.

For carrying flexible cables, pipes or the like it is conventional to use tubes which can be of round, square, rectangular or triangular section, or even polygonal. The expression "support tubes" where it occurs below is to be taken to cover shaped tubes of metals, plastics materials or other materials. In most cases the support tubes are arranged as hanging loops, movable on all sides, their two ends being fixed to the two ends that are movable in relation to each other, so that on the movement of one of these parts an unwinding of the loops takes place.

The conventional support tubes used as "cable carriers" are not self supporting even with short lengths, and have to be supported. For longer lengths the arrangements are unstable, that is to say they easily sag and buckle with vertically arranged loops, or hang obliquely.

An object of the invention is to provide a tube for use as a cable carrier which is self-supporting so as to prevent buckling and to ensure that it does not hang obliquely.

Broadly, the invention consists in a device for carrying flexible cables or pipes from a fixed connection point to a mobile consumer by means of a flexible support tube, in which the flexible support tube is provided in a longitudinally continuous portion of its periphery with a series of spacer devices for holding the tube to a constant length in the said longitudinally continuous portion whereby to permit bending of the tube substantially only in a direction substantially perpendicular thereto.

According to a preferred form of the invention, there is provided an arrangement in which the meshing edges of adjoining windings in a longitudinally continuous peripheral portion of the support tube are supported in relation to each other by means of spacers which in the longitudinal direction restrain the edges in the vicinity of the said peripheral portion and permit a movement substantially only in a direction substantially perpendicular thereto. By this measure it is obtained that the bending or buckling of the support tube is possible in one direction only, the said metal tube on the other hand being self-supporting in other directions.

In one form, the adjoining windings of the support may be restrained in this fully extended position. In this case it is possible for the metal tube to bend in the peripheral portion which is opposite the peripheral portion provided with the spacers. In an alternative arrangement, the edges of the adjoining windings of the metal tube to be restrained in the position in which they are compressed in the longitudinal direction. In this case it is possible for there to be bending towards the said peripheral section.

As concerns the shape of the spacers, while it is important that by means of the said spacers a movement in the longitudinal direction of the edges of adjoining windings of the support tube can be prevented, on the other hand the windings can execute a type of hinge movement transversely to the axial direction.

A preferred embodiment of the invention provides that the spacers consist of a flexible strip arranged fixedly on the said peripheral portion of the support tube. The said strip may for instance consist of sheet steel or a plastics material, and may be arranged internally or externally on the windings of the support tube.

In a further embodiment of the invention, the spacer is a strip with its ends fixedly arranged on the support tube, the said strip being pressed onto the surface of the support tube by a sheathing that is flexible in the longitudinal direction. The said sheathing may consist for instance of metal webbing, or may be wrapped or braided, or may consist of a hose-like envelope. The flexible sheathing prevents the strip, which here also may consist of steel sheet, plastics or the like, from peeling off when the support tube bends.

A further possibility is to construct the spacer devices as individual spacer pieces, attached fixedly in each case to one of the meshing edges and supported against the other edge. The fixing may for instance be by adhesive.

Furthermore the arrangement can be such that the spacer devices can consist of individual spacer pieces wound into the support tube during manufacture in the said longitudinally continuous peripheral portion.

A particularly advantageous form of construction of the spacer devices is obtained if the said devices consist of notches in upstanding profile portions of the shaped strip. These notches can be arranged on a finished support tube, but it is also possible for them to consist of sectionings made in the strip before it goes through the winding process to be formed into a support tube.

Furthermore the said spacers can be formed as a flexible strip having spacer pieces after the nature of a toothed belt, the said spacer pieces engaging in the profiled grooves of the support tube. To prevent the spacer pieces from being lifted off, they can either be fixed in each case to an edge of the adjacent winding, or the strip may be pressed onto the surface of the metal tube by a sheathing that is flexible in the longitudinal direction, the sheathing in this case, as in the previous one, consisting of metal webbing, or may be wrapped or braided, or may consist of a hose-like envelope.

The invention can find its embodiment not only in wound support tubes but also so-called corrugated tubes can be used as the support tubes. By corrugated tubes, there is to be understood tubes manufactured by impressing prearranged wave shapes on seamlessly drawn or welded relatively thinwalled tubes. By arranging spacer devices in the sense of the invention in a longitudinally continuous peripheral portion, the required flexibility in one direction only can be achieved.

Examples of embodiment of the invention are given in the accompanying drawings, in which.

Figure 1:
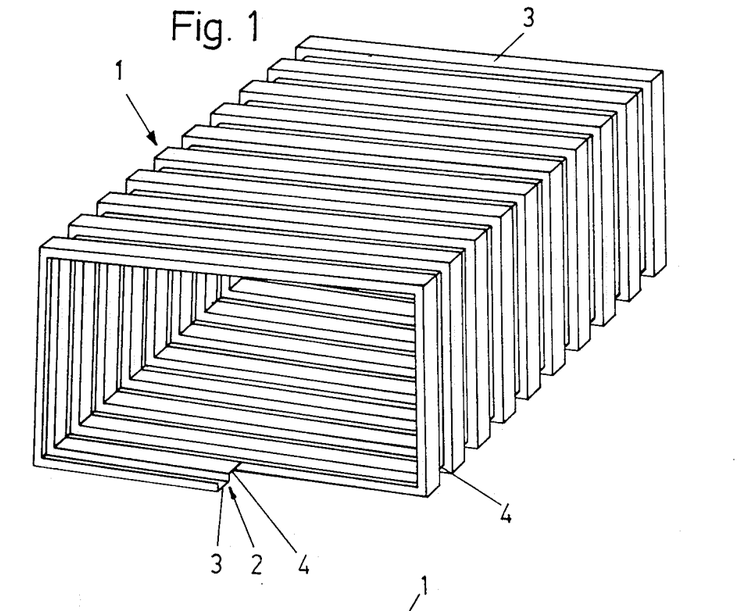
FIG. 1 is a diagrammatic reproduction, in perspective, of a rectangularly shaped support tube.

FIG. 1 shows a metal tube 1, drawn in perspective, and having a shaped metal strip 2 with double grooving. The individual adjoining windings 3 and 4 are formed in each case alternately as upstanding and fluted profiled windings. The arrangement is one in which the metal strip is wound round itself so that the edges of the individual windings mesh with each other. For better comprehension of this, reference should be made to FIGS. 3 and 4, where two meshing windings are identified in each case as 3 and 4. As can be seen, the edges 5 and 6 of the adjoining upstanding and fluted profiled windings engage with each other.

Figure 2:
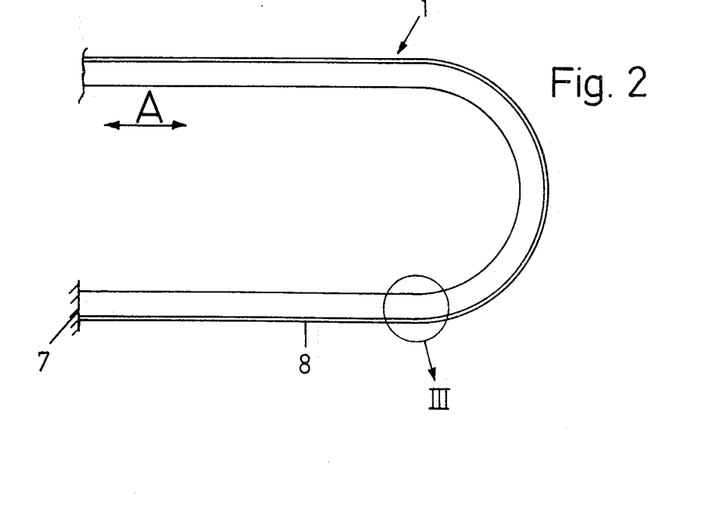
FIG. 2 is a diagrammatic representation of the cable carrying arrangement consisting of a support tube.
Figures 5, 6:
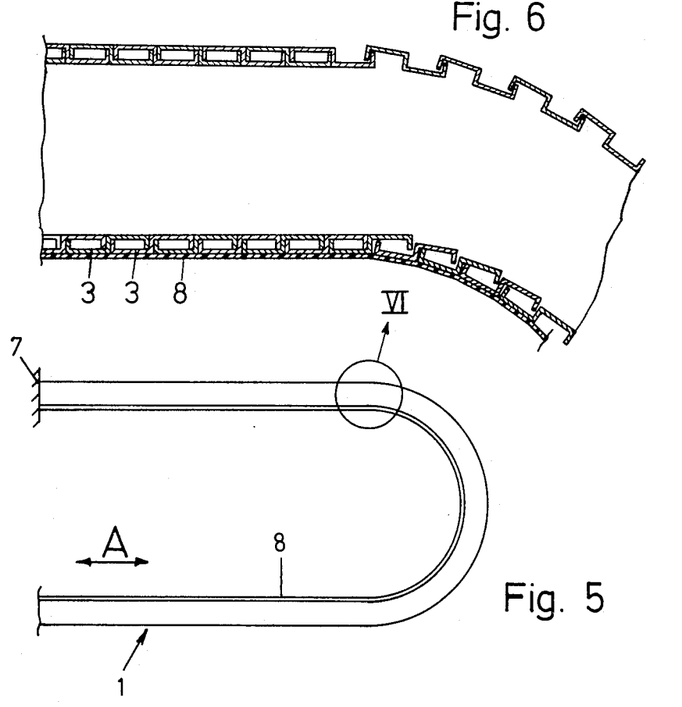
FIG. 5 is a representation similar to FIG. 2.
FIG. 6 shows a detail of the region identified in FIG. 5 by the circle VI.

The device for carrying flexible cables or pipes from a fixed connection point to a mobile consumer is shown diagrammatically in FIGS. 2 and 5. The fixed connection point itself is identified as 7, and from there flexible cables or tubes, which are not shown, are carried to a mobile consumer, movable in the direction of the arrow A. The cables or pipes are supported and surrounded by a metal or other material support tube. In the specification which follows, only the construction of the support tube according to the invention will be described.

As can be seen from FIG. 2, the tube 1 shown therein is self-supporting in the vertical direction; nevertheless movement in the direction of the arrow A is possible, displacing in each case the loops joining the two horizontal parts. The movement takes place without noticeable friction or strain, since the mshing edges 5 and 6 of adjacent windings 3 and 4 are supported by spacer devices in a peripheral portion which is continuous in the longitudinal direction. In the example of embodiment shown in FIGS. 3, 4 and 6, the spacer devices consist of a flexible strip 8 which, viewed from above, covers a portion of width B of the outer surface of the tube 1. The flexible strip 8, which may for instance consist of sheet steel is fixed to the outside of the upstanding windings 3 of the tube, in the example of embodiment shown in the said Figures. In the example of embodiment shown in FIGS. 2, 3 and 4 the positioning of the strip takes place in the extended state of the tube, whereas in the example of embodiment of FIGS. 5 and 6 the positioning of the strip 8 takes place with the metal tube compressed in the longitudinal direction. As can be seen in each case from the right-hand portion of FIGS. 3 and 6, it is possible with the example of embodiment according to FIG. 3 for the metal tube to bend in the peripheral region which is opposite the strip 8, whereas with the arrangement according to FIGS. 5 and 6 the possibility of bending or freedom to bend is on the side with the strip 8.

Figure 3:
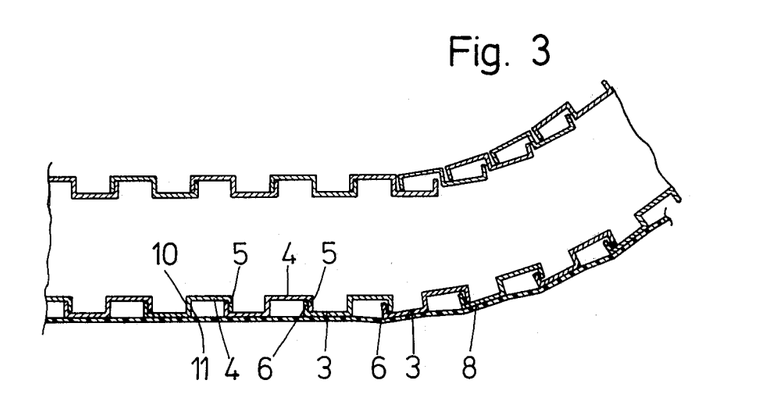
FIG. 3 is a section through the region identified in FIG. 2 by the circle III, on a larger scale.
Figure 4:
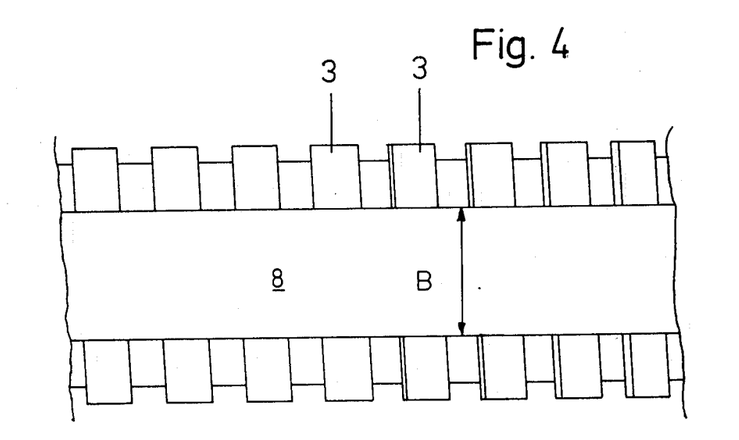
FIG. 4 shows the arrangement according to FIG. 3, viewed from below.

By the fixed arrangement of the strip 8 on the individual upstanding windings 3 it is possible for the edges 5 and 6 in the region B in the longitudinal direction of the metal tube 1 to be fixed in relation to each other, making possible a sort of hinge movement so that it is possible for the metal tube to bend only towards one side, whereas the metal tube, as concerns the remaining three sides, is substantially self-supporting. The movement takes place without noticeable friction or stress.

Figure 7:
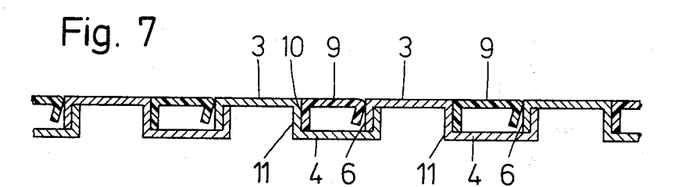
FIGS. 7 to 10 show various embodiments of the spacer devices, in each case showing in longitudinal section the meshing edges of the adjoining windings of a support tube.
Figure 8:
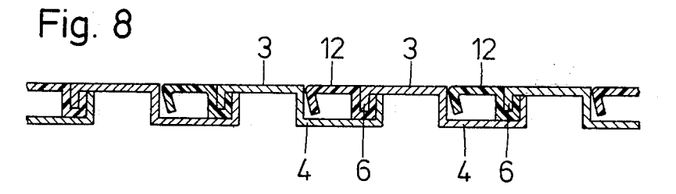
Figure 9:
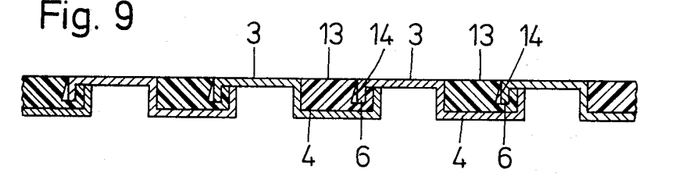
Figure 10:
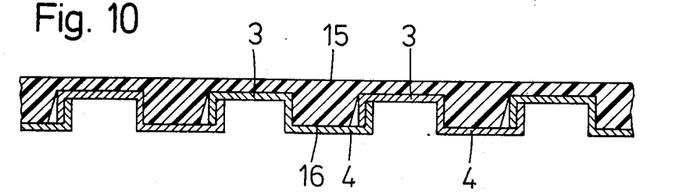
Figure 12:
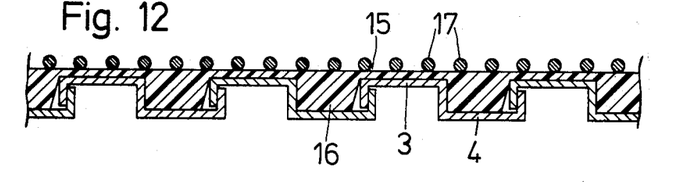
Figure 13:
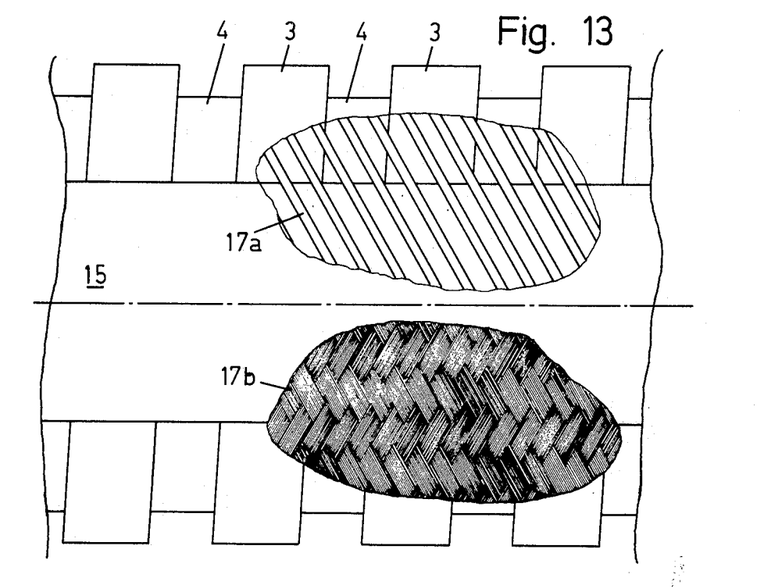
FIG. 13 is a view taken from above onto the arrangements shown in FIGS. 11 and 12, showing various embodiment examples of the sheathing.

FIGS. 7 and 10 show further possible constructions of the spacer devices. In the arrangement according to FIG. 7 the spacer devices consist of individual spacer pieces 9 which, with the metal tube extended in the longitudinal direction, are fixed, for instance by adhesive, in each case to one of the edges 10 of the windings, and are fixedly supported against the edge 6. In FIGS. 8 and 9 the arrangement is again that of spacer pieces, identified as 12 and 13. These spacer pieces are wound-in in the manufacture of the mtal tube in such a manner that the edges 6 engage in correspondingly shaped recesses in the said spacer pieces. The spacer piece 12 is hollow and accordingly elastic, whereas the spacer piece 13 is solid. The bevellings 14 provided in particular with the construction of the spacer pieces 13 enable the hinge-like movement of the metal tube to take place. In the arrangement shown in FIG. 10 the spacer devices are provided in a flexible strip 15 which has spacer pieces 16 after the nature of a toothed belt. The arrangement of the spacer pieces 16 is such that they in each case engage in the profile grooves 4. In the example of embodiment shown in FIG. 10 the flexible strip 15 is fixedly arranged on the tube; there is also the possibility, as is shown in FIG. 12, of fixing the strip 15 by means of a sheathing 17 that is flexible in the longitudinal direction. Examples of embodiment of such flexible sheathing are shown in FIG. 13 and identified as 17a and 17b.

Figure 11:
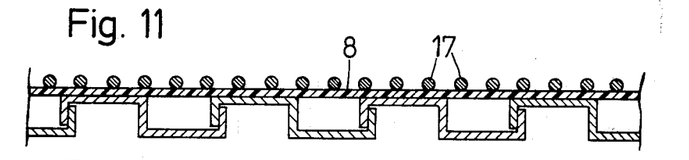
FIGS. 11 and 12, show further embodiment examples in a reproduction similar to FIGS. 7 to 10.

A further example of embodiment of the type of arrangement shown in FIGS. 3 and 4 is shown in FIG. 11, where the flexible strip 8 is fixed on the metal tube only by its ends, which are not shown, whereas the remaining regions are prevented by a sheathing 17 from lifting themselves off the metal tube.

Figure 14:
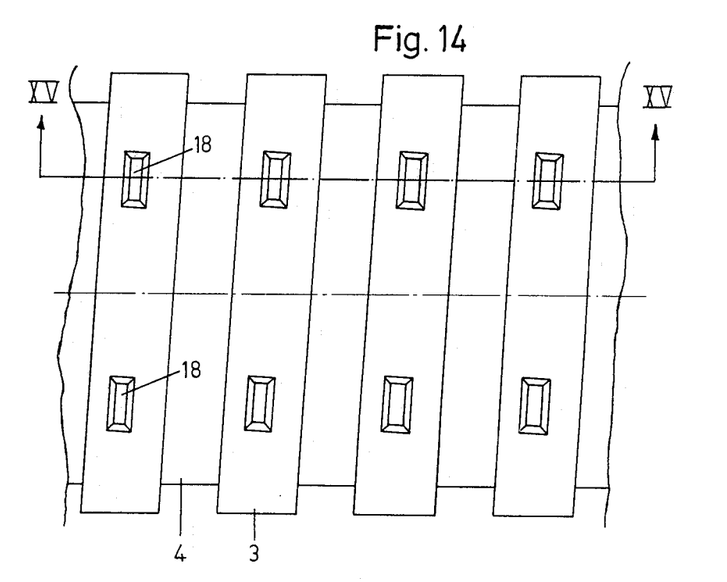
FIG. 14 is a reproduction according to FIG. 13, wherein the spacer devices consist of notches in the upstanding profiled windings.
Figure 15:
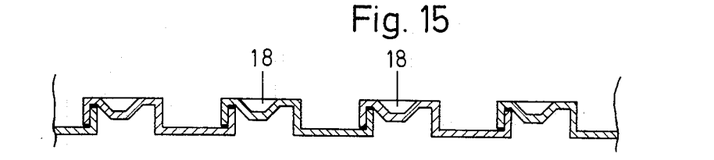
FIG. 15 is a reproduction according to the section line identified by XV — XV in FIG. 14.

In the examples of embodiment shown in FIGS. 14 and 15 the spacer devices consist of notches 18 made in the metal strip, in each case arranged in pairs side-by-side. As can be seen in particular from FIG. 15, with this arrangement too it is possible to restrain the meshing edges of adjacent windings in the longitudinal direction, movement being possible substantially only in the direction transverse thereto. Notches of this type can be made subsequently in finished tubes.

Figure 16:
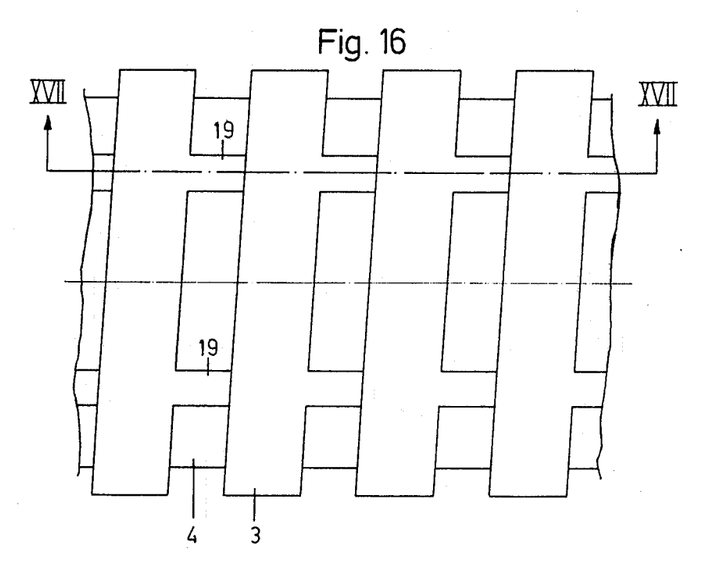
FIG. 16 is a view of a further example of embodiment of the invention taken from above.
Figure 17:
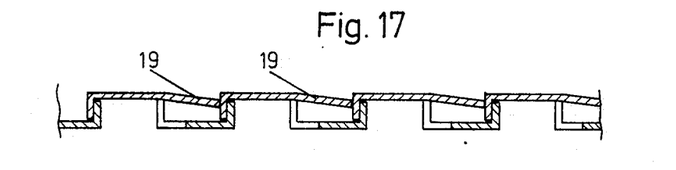
FIG. 17 is a section along the line XVII — XVII in FIG. 16.

In a further arrangement the spacer devices are provided in the form of sectionings 19 made directly in the metal strip, as can be seen in FIGS. 16 and 17. The said sectionings 19 are somewhat like projecting tongues, and can be formed-on before the winging process turns the metal strip into a tube.

In addition it should be noted that tube does not necessarily have to be formed from a metal stripe, and in principle also other materials, such as plastics, could be used for the manufacture.

Various other modifications may be made within the scope of the invention.

What I claim is:

1. A device for carrying flexible cables or pipes from a fixed connection point to a mobile load, said device comprising a flexible support tube capable of bending into an arcuate curve about a bending axis spaced laterally from the tube, said flexible support tube being formed from a profiled strip having two oppositely facing, side-by-side channels formed therein, each channel having an outer sidewall, and both channels having a common inner sidewall, said strip being spirally wound on itself with the outer sidewall of each channel extending into the oppositely facing channel of the adjoining winding; and means provided along one side of said flexible tube for maintaining said one side at a constant length; the other side of said tube being variable in length to accommodate itself to the circumference of an arc following the surface of said other side and having its center at said bending axis.

2. A device according to claim 1, in which said windings are positioned so that when the tube is straight, the outer sidewall of each winding abuts against one of the sidewalls of the adjoining winding, whereby relative movement between adjacent windings along the length of the tube is restrained in one direction, whereas a limited amount of movement in the other direction is permitted, said means being operable to prevent relative movement between said windings in said other direction along said one side of said tube while allowing a limited amount of angular movement between adjacent windings.

3. A device according to claim 2, in which the outer sidewall of each winding abuts against the outer side wall of the adjoining winding, whereby extension of the tube is prevented, whereas a limited amount of compression of the tube is permitted, said means being operable to prevent compression of said tube along said one side, while the other side of the tube is allowed to compress in length.

4. A device according to claim 2, in which the outer sidewall of each winding abuts against the inner sidewall of the adjoining winding, whereby compression of the tube is prevented, whereas a limited amount of extension of the tube is permitted, said means being operable to prevent extension of said tube along said one side while the other side of the tube is allowed to extend in length.

5. A device according to claim 1, wherein said means comprises a series of spacer devices arranged along a longitudinally continuous portion of the periphery of the tube on one side thereof, said spacer devices being operable to hold said tube to a constant length along said one side.

6. A device according to claim 1, wherein the spacer devices consist of a continuous flexible strip fixedly arranged in the said peripheral portion of the tube.

7. A device according to claim 6, wherein the strip is arranged externally on the tube.

8. A device according to claim 1, wherein the spacer devices are formed by a strip fixed by its ends to the tube, and the said strip is pressed against the surface of the tube by means of a sheathing that is flexible in the longitudinal direction.

9. A device according to claim 8, wherein said sheathing consists of a metal webbing.

10. A device according to claim 8, wherein said sheathing consists of a winding.

11. A device according to claim 5, wherein said spacer devices consist of individual spacer pieces which are fixedly arranged in each case to one of said intermeshing edges and are supported against the other edge.

12. A device according to claim 5, wherein said spacer devices consist of notches in the upstanding profile windings.

13. A device according to claim 5, wherein said spacer devices consist of sections made in the strip.

14. A device according to claim 5, wherein said spacer devices are comprised by a flexible strip having spacer pieces after the nature of a toothed belt, the said spacer pieces engaging in the profiled grooves.

15. A device according to claim 14, wherein said spacer pieces are each arranged fixedly on one edge of adjoining windings.

16. A device according to claim 14, wherein said strip is pressed against the surface of the tube by means of a casing that is flexible in the longitudinal direction.

* * * * *

UNITED STATES PATENT AND TRADEMARK OFFICE
CERTIFICATE OF CORRECTION

PATENT NO. : B1 3,957,084

DATED : September 18, 1990

INVENTOR(S) : Werner Jung

It is certified that error appears in the above-identified patent and that said Letters Patent is hereby corrected as shown below:

In Reexamination Certificate B1 3,957,084, Column 2, line 33, "claim 19" should be changed to -- claim 17 --.

Signed and Sealed this

Twenty-seventh Day of October, 1992

Attest:

DOUGLAS B. COMER

*Attesting Officer*  *Acting Commissioner of Patents and Trademarks*

REEXAMINATION CERTIFICATE (630th)

United States Patent [19]

Jung

[11] B1 3,957,084

[45] Certificate Issued Feb. 10, 1987

[54] DEVICE FOR CARRYING FLEXIBLE CABLES OR PIPES FROM A FIXED CONNECTION POINT TO A MOBILE CONSUMER BY MEANS OF A FLEXIBLE TUBE

[75] Inventor: Werner Jung, Rheydt, Fed. Rep. of Germany

[73] Assignee: Katrapat AG, Zug, Switzerland

Reexamination Request:
No. 90/000,900, Nov. 6, 1985

Reexamination Certificate for:
Patent No.: 3,957,084
Issued: May 18, 1976
Appl. No.: 441,104
Filed: Feb. 11, 1974

[30] Foreign Application Priority Data

Feb. 14, 1973 [DE] Fed. Rep. of Germany ... 7305486[U]

[51] Int. Cl.⁴ .............................................. F16L 11/00
[52] U.S. Cl. ..................................... 138/122; 138/136

[56] References Cited

U.S. PATENT DOCUMENTS

2,748,804  4/1956  Guarnaschelli ..................... 285/114
3,311,133  3/1967  Kinander ............................ 138/136

FOREIGN PATENT DOCUMENTS

1675330  12/1971  Fed. Rep. of Germany .
990210  4/1965  United Kingdom .

OTHER PUBLICATIONS

"ekd gelenkrohr" brochure of Ernst Klein (translation enclosed).

*Primary Examiner*—Stephen Marcus

[57] ABSTRACT

There is provided a device for carrying flexible cables or pipes from a fixed connection point to a mobile consumer. The device consists of a flexible support tube which may be either formed from a profiled strip would on itself with intermeshing edges, or a corrugated tube. In order to limit the flexibility of the tube to one direction, there are provided a series of spacers keeping a longitudinally continuous zone of the tube at a substantially constant length. The tube can thus only bend by compression or extension of the zone immediately opposite the zone of constant length. The spacers may take various forms such as a continuous strip secured to one surface of the tube, or a series of individual spacers entering formations in the tube. The individual spacers may in fact be individually secured to the tube or they may be carried on a strip.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5–16 is confirmed.

Claims 1–4 are cancelled.

* * * * *

REEXAMINATION CERTIFICATE (1354th)
United States Patent [19]
Jung

[11] B1 3,957,084

[45] Certificate Issued Sep. 18, 1990

[54] DEVICE FOR CARRYING FLEXIBLE CABLES OR PIPES FROM A FIXED CONNECTION POINT TO A MOBILE CONSUMER BY MEANS OF A FLEXIBLE TUBE

[75] Inventor: Werner Jung, Rheydt, Fed. Rep. of Germany

[73] Assignee: Katrapat AG, Zug, Switzerland

Reexamination Request:
No. 90/000,900, Nov. 6, 1985

Reexamination Certificate for:
Patent No.: 3,957,084
Issued: May 18, 1976
Appl. No.: 441,104
Filed: Feb. 11, 1974

[30] Foreign Application Priority Data

Feb. 14, 1973 [DE] Fed. Rep. of Germany ....... 7305486

[51] Int. Cl.$^5$ ............................................. F16L 11/00
[52] U.S. Cl. ..................... 138/136; 138/121; 138/106; 138/134; 138/135; 138/154; 174/68.3
[58] Field of Search ............... 138/118, 129, 121, 122, 138/134, 135, 136, 144, 150, 154, 172, 173, 106; 174/47, 683

[56] References Cited
U.S. PATENT DOCUMENTS

| | | | |
|---|---|---|---|
| 449,713 | 6/1893 | Commichau | 138/134 |
| 1,593,016 | 7/1926 | Campbell | 138/135 |
| 1,781,574 | 11/1930 | Frederickson | 138/135 |
| 2,028,793 | 1/1936 | Mascuch | 138/136 |
| 2,401,949 | 6/1946 | Mariner | 138/154 |
| 2,748,804 | 4/1956 | Guarnaschelli | 285/114 |
| 3,301,940 | 1/1967 | Rischard et al. | 138/120 |
| 3,311,133 | 3/1967 | Kinander | 138/136 |

FOREIGN PATENT DOCUMENTS

1675330 12/1971 Fed. Rep. of Germany .
990210 4/1965 United Kingdom .

OTHER PUBLICATIONS

"ekd gelenkrohr", Brochure of Ernst Klein (translation enclosed).

*Primary Examiner*—James E. Bryant, III

[57] ABSTRACT

There is provided a device for carrying flexible cables or pipes from a fixed connection point to a mobile consumer. The device consists of a flexible support tube which may be either formed from a profiled strip would on itself with intermeshing edges, or a corrugated tube. In order to limit the flexibilty of the tube to one direction, there are provided a series of spacers keeping a longitudinally continuous zone of the tube at a substantially constant length. The tube can thus only bend by compression or extension of the zone immediately opposite the zone of constant length. The spacers may take various forms such as a continuous strip secured to one surface of the tube, or a series of individual spacers entering formations in the tube. The individual spacers may in fact be individually secured to the tube or they may be carried on a strip.

REEXAMINATION CERTIFICATE ISSUED UNDER 35 U.S.C. 307

THE PATENT IS HEREBY AMENDED AS INDICATED BELOW:

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-16 dependent on an amended claim, are determined to be patentable.

New claims 17 and 18 are added and determined to be patentable.

1. A device for carrying flexible cables or pipes from a fixed connection point to a mobile load, said device comprising a flexible support tube capable of bending into an arcuate curve about a bending axis spaced laterally from the tube, said flexible support tube being formed from a profiled strip having two oppositely facing, side-by-side channels formed therein, each channel having an outer sidewall, and both channels having a common inner sidewall, said strip being spirally wound on itself with the outer sidewall of each channel extending into the oppositely facing channel of the adjoining winding; and means provided along one side of said flexible tube for [maintaining said one side at a constant length; the other side of said tube being variable in length] *preventing said one side from expanding or contracting while permitting the opposite side to expand or contract a limited amount* to accommodate itself to the circumference of an arc following the surface of said [other] *opposite* side and having its center at said bending axis.

17. *A device for carrying flexible cables or conduits from a fixed connection point to a mobile load, said device comprising a flexible support tube capable of bending into an arcuate curve about a bending axis spaced laterally from the tube, said flexible support tube being formed from a profiled strip having two oppositely facing, side-by-side channels formed therein, each channel having an outer side wall and both channels having a common inner side wall, said strip being spirally wound on itself to form a plurality of windings, each presenting an inner surface and and outer surface with the outer side wall of each channel extending into the oppositely facing channel of the adjoining winding so that said outer side wall can move within the channel of the adjoining winding to enable said tube to be extended and compressed a limited amount; and means attached to the surfaces of said windings along one side of said flexible tube for preventing the movement of said windings relative to each other along said one side and thereby preventing said one side of said tube from expanding or contracting while permitting the other side of said tube to expand or contract a limited amount to accommodate itself to the circumference of an arc following the surface of said other side and having its center at said bending axis.*

18. *A device according to claim 19 wherein said means maintains said one side in either its fully compressed condition or its fully extended condition.*

* * * * *